(12) United States Patent
Hojo et al.

(10) Patent No.: US 10,344,667 B2
(45) Date of Patent: Jul. 9, 2019

(54) VALVE CONTROL DEVICE AND VALVE SYSTEM

(71) Applicants: KEIHIN CORPORATION, Tokyo (JP); HONDA MOTOR CO., LTD., Tokyo (JP)

(72) Inventors: Sachio Hojo, Shioya-gun (JP); Youichiro Shikine, Shioya-gun (JP); Masatomo Yoshida, Shioya-gun (JP); Kensuke Yamamoto, Utsunomiya (JP); Akihito Inoue, Nasukarasuyama (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/558,666

(22) PCT Filed: Mar. 24, 2016

(86) PCT No.: PCT/JP2016/059370
§ 371 (c)(1),
(2) Date: Sep. 15, 2017

(87) PCT Pub. No.: WO2016/152971
PCT Pub. Date: Sep. 29, 2016

(65) Prior Publication Data
US 2018/0112590 A1     Apr. 26, 2018

(30) Foreign Application Priority Data
Mar. 26, 2015   (JP) ................................. 2015-064675

(51) Int. Cl.
*F02B 37/18*     (2006.01)
*F02B 39/16*     (2006.01)
(Continued)

(52) U.S. Cl.
CPC ............ *F02B 37/183* (2013.01); *F02B 37/18* (2013.01); *F02B 37/186* (2013.01); *F02B 39/16* (2013.01);
(Continued)

(58) Field of Classification Search
None
See application file for complete search history.

(56) References Cited

U.S. PATENT DOCUMENTS

2006/0207552 A1   9/2006  Kato
2011/0203358 A1   8/2011  Tanaya
(Continued)

FOREIGN PATENT DOCUMENTS

JP   2006-257923 A   9/2006
JP   2011-174382 A   9/2011
(Continued)

OTHER PUBLICATIONS

International Search Report & Written Opinion dated Jun. 21, 2016 corresponding to International Patent Application No. PCT/JP2016/059370, and English translation thereof.

*Primary Examiner* — Ryan A Jarrett
(74) *Attorney, Agent, or Firm* — Squire Patton Boggs (US) LLP (57) ABSTRACT

A valve control device controls an actuator for operating a valve based on a signal indicating a degree of opening of the valve and a signal indicating starting of an engine for which the valve. The valve control device includes a fully closed learning processing unit configured to learn a seated position at which a valve body is seated on a valve seat whenever the engine is started on the basis of the startup signal and the degree-of-opening signal, and a target value setting unit configured to set a soft-landing initiation position when the valve body is seated based on the seated position and set a target value with the valve body is decelerated from the soft-landing initiation position, and the valve body is seated (Continued)

at a predetermined seating speed. A control driving unit is configured to generate a drive signal based on the target value and the degree-of-opening signal.

5 Claims, 4 Drawing Sheets (51) Int. Cl.
 *F02D 41/20* (2006.01)
 *F02D 41/24* (2006.01)
(52) U.S. Cl.
 CPC ......... *F02D 41/20* (2013.01); *F02D 41/2464* (2013.01); *F02D 2041/2024* (2013.01); *F02D 2250/16* (2013.01); *Y02T 10/144* (2013.01)

(56) References Cited

U.S. PATENT DOCUMENTS

| | | | |
|---|---|---|---|
| 2014/0341703 A1 | 11/2014 | Kokotovic et al. | |
| 2015/0059338 A1* | 3/2015 | Wang | F02B 37/186 60/602 |
| 2015/0082788 A1* | 3/2015 | Wang | F02B 37/186 60/602 |
| 2015/0240707 A1* | 8/2015 | Wang | F02B 37/16 60/602 |
| 2015/0354441 A1* | 12/2015 | Luehrsen | F02D 41/0007 415/1 |
| 2018/0073450 A1* | 3/2018 | Hojo | F02B 37/18 |
| 2018/0106187 A1* | 4/2018 | Ito | F02B 37/183 |
| 2018/0112592 A1* | 4/2018 | Hojo | F02B 39/16 |

FOREIGN PATENT DOCUMENTS

| | | |
|---|---|---|
| JP | 2013-142379 A | 7/2013 |
| JP | 2014-174872 A | 9/2014 |
| JP | 2015-025412 A | 2/2015 |
| JP | 2015-040488 A | 3/2015 |

\* cited by examiner

VALVE CONTROL DEVICE AND VALVE SYSTEM

TECHNICAL FIELD

The present invention relates to a valve control device and a valve system.

Priority is claimed on Japanese Patent Application No. 2015-064675, filed on Mar. 26, 2015, the content of which is incorporated herein by reference.

BACKGROUND ART

A technology for properly controlling a supercharging pressure of combustion air by adjusting a degree of opening of a wastegate valve provided on a bypass passage for exhaust gas in a supercharger (a supercharging system and a method for controlling the supercharging system) is disclosed in Patent Literature 1 below. In the supercharging system, a fully closed state of the wastegate valve (a fully closed position of a valve body) is corrected depending on a temperature of the supercharger, and thereby the degree of opening of the wastegate valve is properly adjusted regardless of the temperature of the supercharger.

CITATION LIST

Patent Literature

[Patent Literature 1]
Japanese Unexamined Patent Application, First Publication No. 2013-142379

SUMMARY OF INVENTION

Technical Problem

Meanwhile, a moving speed (a seating speed) of the valve body in the wastegate valve when the valve body is seated on a valve seat affects wear/damage to the valve body and the valve seat. That is, as seating speed becomes faster, an impact force acting on the valve body and the valve seat when seated increases, and thus the wear/damage to the valve body and the valve seat increases. Therefore, making the seating speed proper is a very important matter to prolong a life span of the wastegate valve.

On the other hand, when a speed when the wastegate valve is put in a fully closed state (a full-close-time speed) is set to a low speed as a whole, a time it takes the valve body to be seated on the valve seat is prolonged, and thus an influence is exerted on responsiveness of opening/closing control of the valve. Therefore, to satisfy this antinomic demand, dividing the full-close-time speed into an initial speed and a late speed, setting the initial speed to a relatively high speed, and setting the late speed to a relatively low speed to relieve the impact force can be considered.

However, when a switching point (a soft-landing initiation position of the valve body) between the initial speed and the late speed is set for a valve in which the fully closed position of the valve body is corrected depending on the temperature of the supercharger as in Patent Literature 1, a period of the late speed may be prolonged, and the time it takes the valve body to be seated on the valve seat may be increased.

An aspect of the present invention was made in view of the above circumstances, and an object thereof is to provide a valve control device and a valve system capable of optimizing a soft-landing initiation position of a valve body in a valve and thereby reducing a time it takes the valve body to be seated on a valve seat.

Solution to Problem

To solve the above technical problems to achieve the related object, the present invention adopts the following aspects.

(1) A valve control device of an aspect according to the present invention controls an actuator operating a valve on the basis of a degree-of-opening signal indicating a degree of opening of the valve and a startup signal indicating starting of an engine for which the valve is provided, and includes: a fully closed learning processing unit configured to learn a seated position at which a valve body of the valve is seated on a valve seat of the valve whenever the engine is started on the basis of the startup signal and the degree-of-opening signal; a target value setting unit configured to set a soft-landing initiation position when the valve body is seated on the basis of the seated position and set a control target value at which the valve body is decelerated from the soft-landing initiation position and the valve body is seated at a predetermined seating speed; and a control driving unit configured to generate a drive signal supplied to the actuator on the basis of the control target value and the degree-of-opening signal.

(2) In the aspect according to (1) above, the fully closed learning processing unit may learn the seated position of the valve body whenever the engine is started to acquire a long-term learning value, and learn the seated position of the valve body whenever the valve body is seated to acquire a short-term learning value, and the control driving unit may correct the degree of opening of the valve to generate the drive signal on the basis of the short-term learning value.

(3) In the aspect according to (1) or (2) above, the valve control device may further include a filter unit configured to perform medial filtering on the degree-of-opening signal and output the result to the control driving unit, and the control driving unit may include a position control unit that generates a position operation amount of the valve body, and a speed control unit that generates a speed operation amount of the valve body.

(4) In the aspect according to (3) above, the speed control unit may include a speed limiter that regulates an upper limit of the seating speed at which the valve body is seated on the valve seat.

(5) In the aspect according to any one of (1) to (4) above, the valve may be a wastegate valve provided for a supercharger of the engine.

(6) A valve system of another aspect according to the present invention includes: a valve; an actuator configured to operate the valve; and a valve control device according to any one of (1) to (5) above.

Advantageous Effects of Invention

According to the aspects of the present invention, the soft-landing initiation position when the valve body is seated is set on the basis of the learned seated position of the valve body whenever the engine is started, and the moving speed of the valve body from the soft-landing initiation position is decelerated to seat the valve body. Thus, for example a time which it takes the valve body to be seated on the valve seat when the valve is subjected to thermal expansion can be inhibited from being prolonged. Therefore, according to the aspects of the present invention, a valve control device and a valve system capable of reducing a time which it takes the valve body to be seated on the valve seat by optimizing the soft-landing initiation position of the valve body in the valve can be provided.

DESCRIPTION OF EMBODIMENTS

Hereinafter, an embodiment of the present invention will be described with reference to the drawings.

Figure 1:
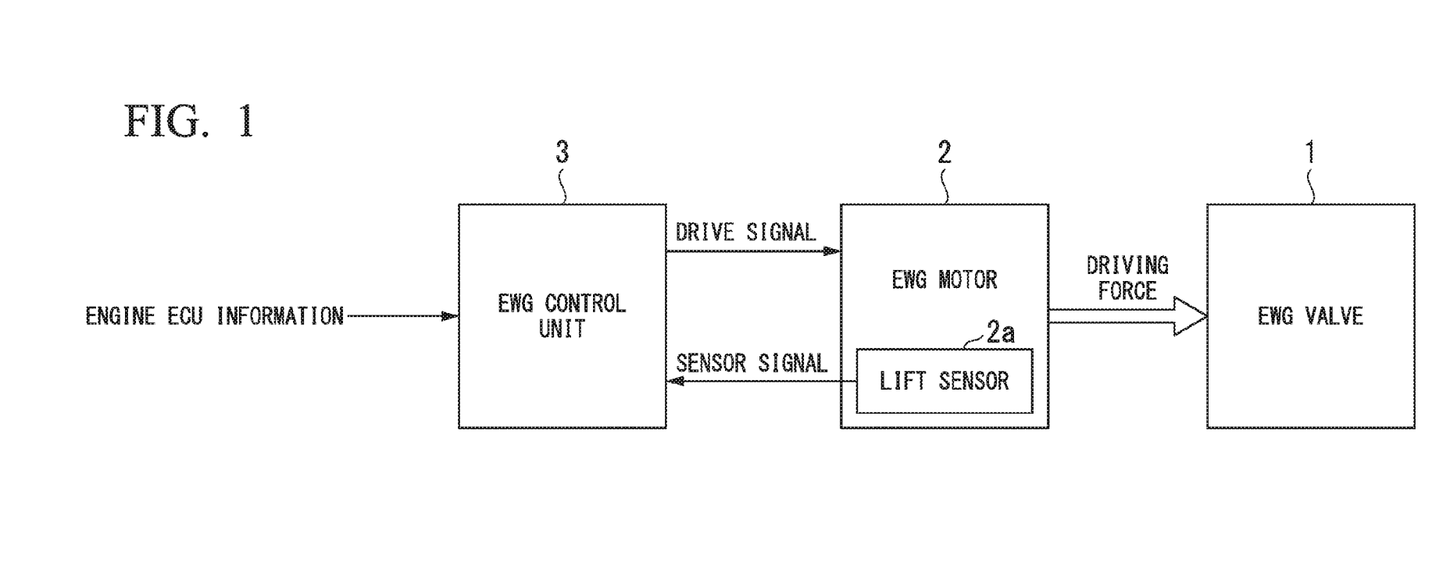
FIG. 1 is a block diagram illustrating a functional constitution of a valve system according to an embodiment of the present invention.

A valve system and valve control device according to the present embodiment include a functional constitution as illustrated in FIG. 1. That is, as illustrated in FIG. 1, the valve system includes an EWG valve (a valve) 1, an EWG motor (an actuator) 2, and an EWG control unit 3. "EWG" is short for "electric waste gate."

The EWG valve 1 is a wastegate valve that is provided on a bypass passage for engine exhaust gas in a supercharger, and adjusts a supercharging pressure of combustion air supplied to an engine. That is, when a degree of opening of the EWG valve 1 is increased, the supercharging pressure is reduced. In contrast, when the degree of opening of the EWG valve 1 is reduced, the supercharging pressure is increased. This EWG valve 1 is mechanically connected to the EWG motor 2 via a predetermined coupling mechanism, and the degree of opening thereof is adjusted by a driving force of the EWG motor 2.

The degree of opening of the EWG valve 1 is a physical amount regulated by a position (a lift amount) of a valve body relative to a valve seat in the EWG valve 1. That is, when the lift amount is increased, that is, when the distance of the valve body from the valve seat is increased, the degree of opening of the EWG valve 1 is increased. In contrast, when the lift amount is reduced, that is, when the distance of the valve body from the valve seat is reduced, the degree of opening of the EWG valve 1 is reduced.

The EWG motor 2 is an actuator that drives the EWG valve 1, for instance, a direct current motor. This EWG motor 2 is operated on the basis of a drive signal input from the EWG control unit 3, and adjusts the degree of opening of the EWG valve 1. The EWG motor 2 includes a lift sensor 2a. The lift sensor 2a outputs a voltage indicating an actual lift amount (a real lift amount) of the valve body in the EWG valve 1 as a sensor signal. The sensor signal is a signal (a degree-of-opening signal) indicating the real lift amount, that is, an actual degree of opening (a real degree of opening) of the EWG valve 1.

The EWG control unit 3 is a valve control device in the present embodiment, and adjusts the degree of opening of the EWG valve 1 by controlling the EWG motor 2. The EWG control unit 3 is one control functional element in an engine ECU, acquires a variety of information (engine ECU information) required for its own control functions from a master control functional element constituting a master control system in the engine ECU, acquires the sensor signal from the lift sensor 2a, and generates the drive signal on the basis of the engine ECU information and the sensor signal.

The engine ECU information is a signal that indicates an engine operating state or an instruction signal of the engine ECU and is for instance an IG ON signal (a signal indicating an ON state of an ignition switch), a target lift amount, and so on. This EWG control unit 3 has feedback control of the EWG motor 2 on the basis of the engine ECU information and the real lift amount which the sensor signal indicates.

The target lift amount is a control target value indicating a degree-of-opening target of the EWG valve 1. The IG ON signal is a signal indicating an ON/OFF state of the ignition switch or a startup signal indicating a startup state of the engine.

Figure 2:
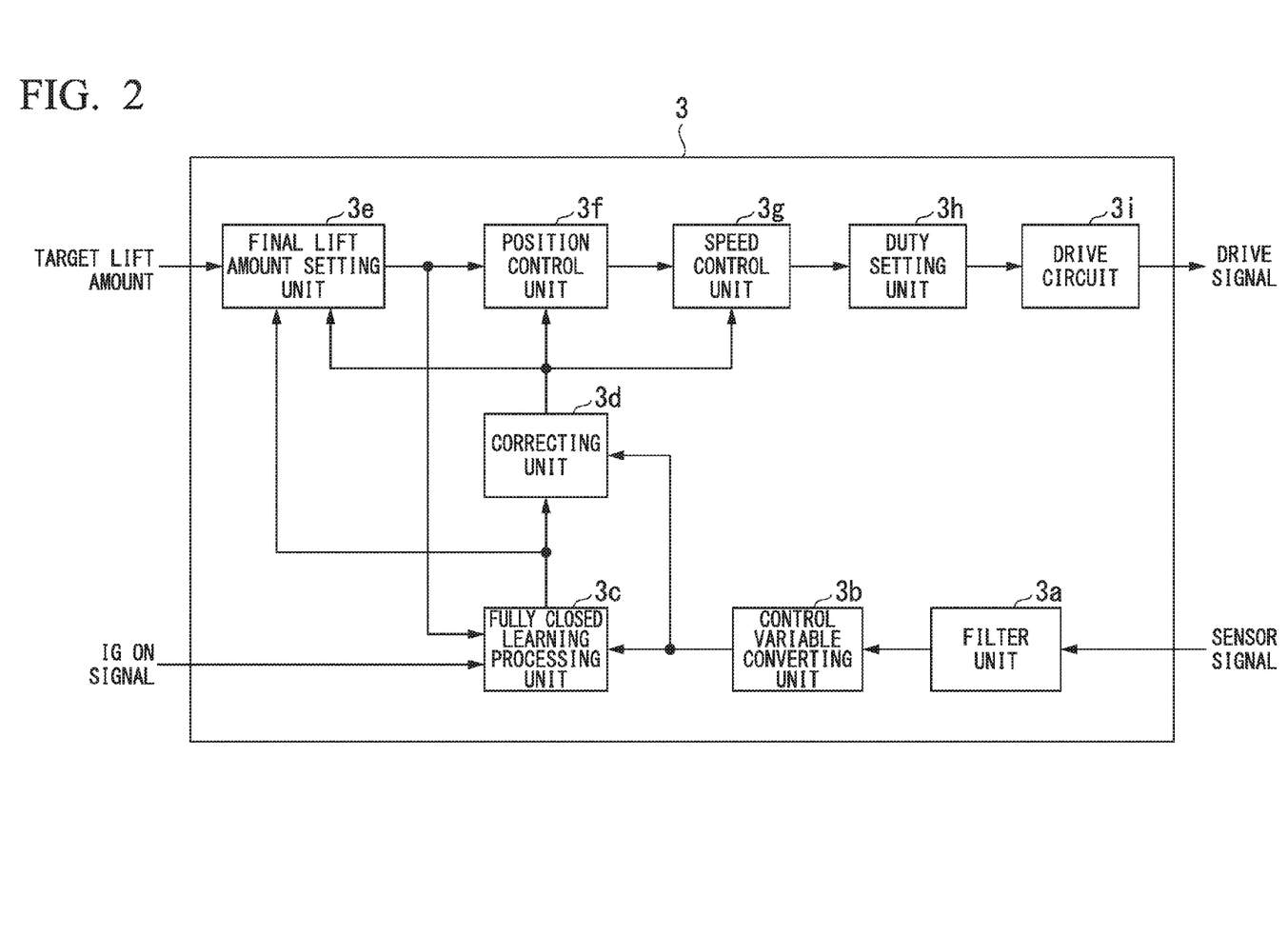
FIG. 2 is a block diagram illustrating a functional constitution of a valve control device according to an embodiment of the present invention.

To be more specific, as illustrated in FIG. 2, this EWG control unit 3 includes a filter unit 3a, a control variable converting unit 3b, a fully closed learning processing unit 3c, a correcting unit 3d, a final lift amount setting unit (a target value setting unit) 3e, a position control unit 3f, a speed control unit 3g, a DUTY setting unit 3h, and a drive circuit 3i as functional components. Among these functional components, the filter unit 3a, the control variable converting unit 3b, the correcting unit 3d, the position control unit 3f, the speed control unit 3g, the DUTY setting unit 3h, and the drive circuit 3i constitutes a control driving unit in the present invention. The "DUTY" is a term indicating a duty ratio.

The filter unit 3a converts a sensor signal or an analog voltage signal, which is input from the lift sensor 2a, into a digital signal (detected voltage data), performs median filtering (digital signal processing) on the digital signal, and outputs the result to the control variable converting unit 3b. The median filtering is filtering used to remove noise by extracting a medium value (a median) of each predetermined amount of data with respect to detected voltage data that is time series data. The lift sensor 2a outputting the sensor signal makes it easy for various kinds of noise to overlap because it is provided for the EWG motor 2 attached to an inside of the engine, but the filter unit 3a outputs the detected voltage data, which more accurately indicates the lift amount (the degree of opening) by removing this noise, to the control variable converting unit 3b.

Here, moving average processing is generally used in the digital signal processing for removing the noise. However, since the median filtering has higher noise removal performance than the moving average processing, the filter unit 3a adopts the median filtering. In the present embodiment, the speed control unit 3g is provided in addition to the position control unit 3f. However, the speed control unit 3g calculates a speed control variable using a differential value of the lift amount (the degree of opening), and thus is easily affected by noise overlapping the lift amount (the degree of opening). In the present embodiment, since this speed control unit 3g is provided, the median filtering is adopted instead of the moving average processing.

The control variable converting unit 3b converts the detected voltage data (the voltage amount) into the lift amount (the position).

The control variable converting unit 3b has, for instance, a conversion table showing a relation between the detected voltage data and the lift amount, extracts the lift amount equivalent to the detected voltage data on the basis of the conversion table, and outputs the extracted lift amount to the fully closed learning processing unit 3c. In place of the conversion table, a conversion formula showing the relation between the detected voltage data and the lift amount may be pre-stored, and the lift amount equivalent to the detected voltage data may be extracted on the basis of the conversion formula.

The fully closed learning processing unit 3c is a functional component that learns the lift amount (the seated position) as a fully closed lift amount when the valve body of the EWG valve 1 is seated on the valve seat. The fully closed lift amount varies depending on a temperature of the EWG valve 1, and thus cannot be treated as a fixed value. Due to these circumstances, the fully closed learning processing unit 3c learns the lift amount (the seated position) as the fully closed lift amount when the valve body is seated on the valve seat on the basis of the IG ON signal input from the engine ECU as one of the pieces of engine ECU information and the actual lift amount (the position of the valve body relative to the valve seat in the EWG valve 1) input from the control variable converting unit 3b.

Here, the fully closed lift amount includes a long-term learning value and a short-term learning value. The long-term learning value is a learning value acquired whenever the engine is started, whereas the short-term learning value is a learning value acquired whenever the valve body is seated. This long-term learning value is to consider an error or the like caused by a mounting error or wear of the EWG motor 2 on the EWG valve 1, and become a standard for setting a soft landing initiation lift amount and a soft landing completion lift amount as will be described below. On the other hand, the short-term learning value is to consider an influence caused by thermal expansion of the EWG valve 1 in addition to the error or the like caused by the mounting error or wear of the EWG motor 2, and become a standard for calculating the correction lift amount as will be described below.

That is, when it is determined on the basis of the IG ON signal that the engine is started, the fully closed learning processing unit 3c stores the fully closed lift amount when the valve body of the EWG valve 1 is seated first after the engine is started as the long-term learning value. On the other hand, whenever the valve body of the EWG valve 1 is seated on the valve seat, the fully closed learning processing unit 3c stores the fully closed lift amount at that time as the short-term learning value regardless of the starting of the engine.

The fully closed learning processing unit 3c also uses the IG ON signal indicating the starting of the engine in addition to the actual lift amount (the real lift amount) input from the control variable converting unit 3b, thereby acquiring the long-term learning value, and acquires the short-term learning value on the basis of only the actual lift amount input from the control variable converting unit 3b. This fully closed learning processing unit 3c outputs the long-term and short-term learning values to the final lift amount setting unit 3e, and outputs only the short-term learning value to the correcting unit 3d. A learning process of the fully closed lift amount in this fully closed learning processing unit 3c will be described in detail in the following operation description.

The correcting unit 3d is a functional component that compensates for the real lift amount input from the control variable converting unit 3b on the basis of the short-term learning value input from the fully closed learning processing unit 3c. That is, the correcting unit 3d takes a difference between the real lift amount and the short-term learning value, and thereby calculates a lift amount (a correction lift amount) based on the short-term learning value and outputs the correction lift amount to the position control unit 3f and the speed control unit 3g.

The final lift amount setting unit 3e is a target value setting unit that sets a final target lift amount (a control target value) on the basis of the target lift amount input as a piece of engine ECU information from the engine ECU, the long-term and short-term learning values input from the fully closed learning processing unit 3c, and the correction lift amount input from the correcting unit 3d. The target lift amount is a signal designating the lift amount (the degree of opening) of the EWG valve 1 as a square-wave voltage value. With respect to this target lift amount, the final lift amount setting unit 3e performs specific processing on the target lift amount when the valve body of the EWG valve 1 is seated on the valve seat, thereby generating the final target lift amount with which the valve body can be decelerated to make a soft landing on the valve seat.

Although will be described below in detail, the final lift amount setting unit 3e divides a period required until the valve body is seated after initiating movement (downward movement relative to the valve seat) for the seating of the valve body into two periods or former and latter periods, and generates the final target lift amount (the control target value) with which the valve body makes a soft landing on the valve seat by moving the valve body downward at a highest speed in the former period and moving the valve body at a relatively gentle speed (a seating speed) in the latter period. The final lift amount setting unit 3e sets a switching point (a soft landing initiation lift amount) between the former and latter periods and a final stop target lift amount of the valve body on the basis of the long-term learning value and the short-term learning value.

The position control unit 3f generates a position operation amount and outputs it to the speed control unit 3g. That is, the position control unit 3f performs well-known PID processing on a difference between the final target lift amount (the control target value) input from the final lift amount setting unit 3e and the correction lift amount input from the correcting unit 3d, thereby generating the position operation amount. Details of the PID processing, that is, processing content or gains, are properly set depending on required performance (control performance) in the control of the EWG valve 1.

The speed control unit 3g generates a speed operation amount on the basis of the position operation amount input from the position control unit 3f and the correction lift amount input from the correcting unit 3d, and outputs the speed operation amount to the DUTY setting unit 3h. That is, the speed control unit 3g performs limiter processing on the position operation amount input from the position control unit 3f, and performs differential processing on the correction lift amount input from the correcting unit 3d. The speed control unit 3g performs well-known PID processing on a difference between the position operation amount after the limiter processing and a lift speed obtained by the differential processing, thereby generating the speed operation amount. The processing content or the gains are properly set for the PID processing in the speed control unit 3g depending on the required performance (the control performance) in the control of the EWG valve 1.

The DUTY setting unit 3h and the drive circuit 3i will be described. For convenience, the drive circuit 3i will be described first. The drive circuit 3i is a motor drive circuit having a pulse drive system. That is, the drive circuit 3i converts direct current power into pulse width modulation (PWM) power on the basis of a PWM signal input from the DUTY setting unit 3h as a control signal, and outputs the PWM power to the EWG motor 2 as a drive signal.

On the other hand, the DUTY setting unit 3*h* is a PWM signal generator for generating the PWM signal on the basis of the speed operation amount input from the speed control unit 3*g*. The DUTY setting unit 3*h* has a function (as a DUTY limiter) of performing the limiter processing on the speed operation amount. That is, the DUTY setting unit 3*h* performs the limiter processing on the speed operation amount, thereby generating the PWM signal that regulates an upper limit of the duty ratio of the PWM signal, that is, a highest rotational speed of the EWG motor 2.

The DUTY limiter is set to be different depending on a part of the final target lift amount.

The constitutions of the valve system and the valve control device according to the present embodiment have been described above. In the present embodiment, the valve control device is a control device that uses the EWG valve 1 (the wastegate valve) provided along with the supercharger.

Figure 3A:
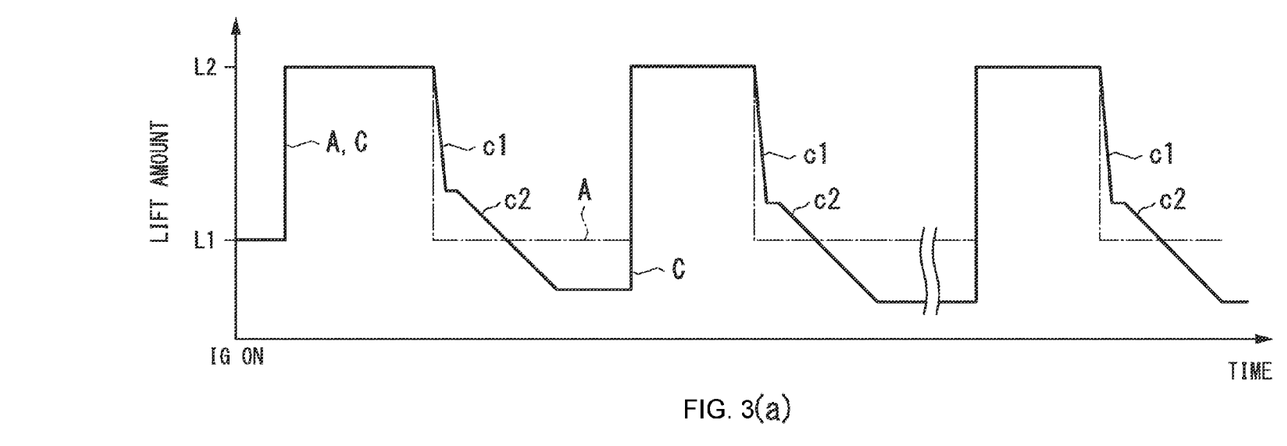
FIGS. 3(a) and 3(b) are timing charts illustrating a control operation of the valve control device according to the embodiment of the present invention.

Next, operations of the valve system and the valve control device configured in this way will be described in detail with further reference to FIGS. 3(*a*), 3(*b*) and 4.

In the present embodiment, a basic operation (a normal operation) of the EWG control unit 3 (the valve control device) is to generate a drive signal on the basis of a feedback control technique, and a target lift amount and a sensor signal. The EWG motor 2 is operated on the basis of the drive signal, and thereby a degree of opening of the EWG valve 1 is adjusted according to the target lift amount.

In the basic operation of this EWG control unit 3, the final lift amount setting unit 3*e* sets the final target lift amount (the control target value) C on the basis of the target lift amount A input from the engine ECU (the master control system), the long-term and short-term learning values B and D input from the fully closed learning processing unit 3*c*, and the correction lift amount input from the correcting unit 3*d*. That is, as illustrated in FIG. 3(*a*), the final lift amount setting unit 3*e* uses the long-term and short-term learning values B and D and the correction lift amount with respect to the target lift amount that is the square-wave voltage value, so that a falling section when the EWG valve 1 is fully closed and a low level section in which the lift amount at the time of full closure is designated are corrected.

Figure 3B:
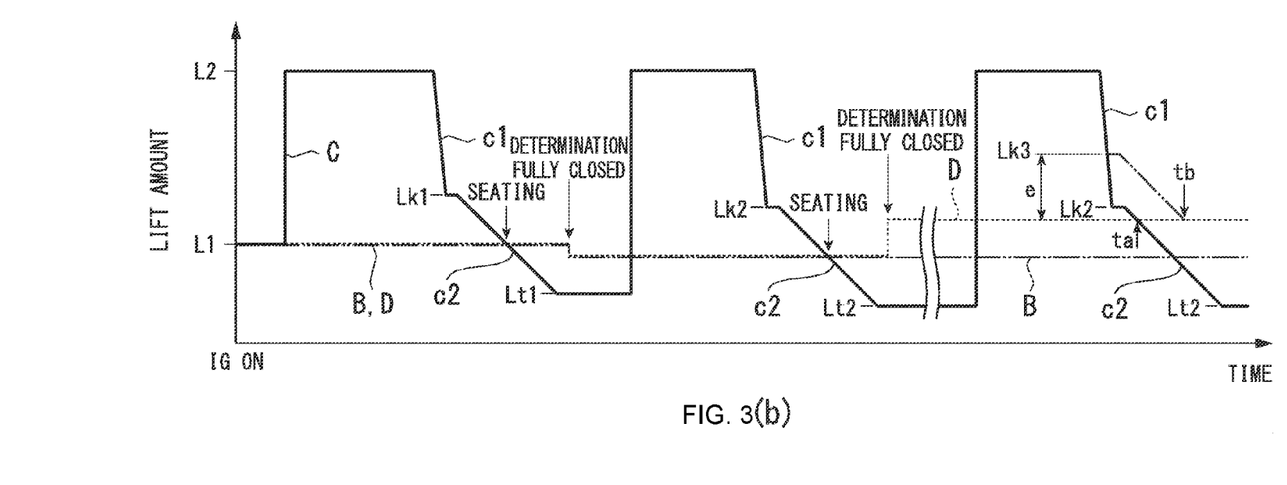
Figure 4:
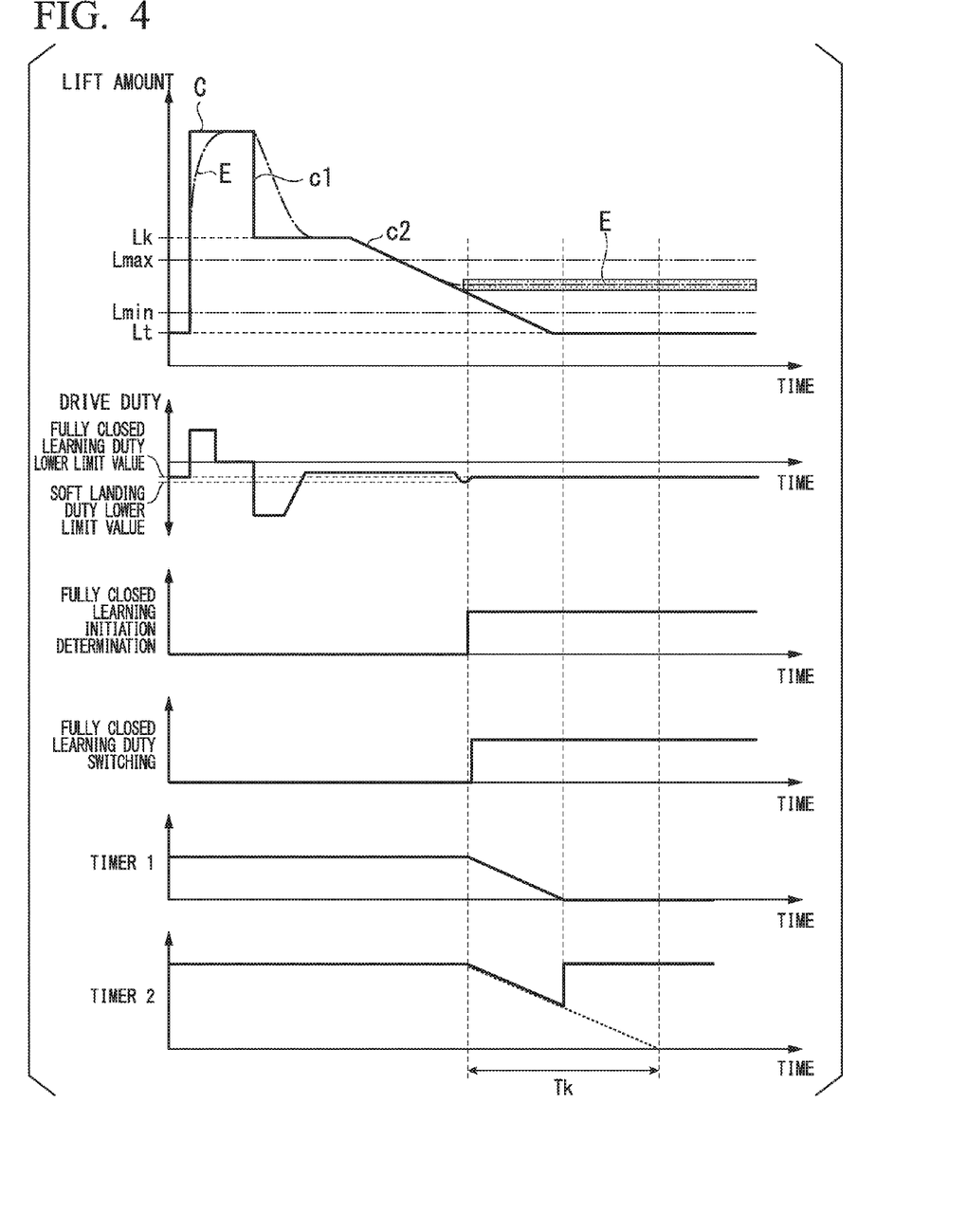
FIG. 4 is a timing chart illustrating a fully closed learning process in the embodiment of the present invention.

To be more specific, as illustrated in FIG. 3(*b*), the final lift amount setting unit 3*e* sets a soft landing initiation lift amount Lk1 and a soft landing completion lift amount Lt1 with respect to the long-term learning value B. That is, the final lift amount setting unit 3*e* sets the initiation lift amount (the soft landing initiation lift amount Lk1) when the valve body of the EWG valve 1 is soft-landed on the valve seat and the soft landing completion lift amount Lt1 when the valve body is stopped on the basis of the long-term learning value B, the short-term learning value D, and a defined value (a constant) K as follows.

*Lk*=Long-term learning value *B*−Short-term learning value *D*+Defined value *K*

*Lt*=Long-term learning value *B*−Short-term learning value *D*−Defined value *K*

The final lift amount setting unit 3*e* monitors correction lift amounts that are input from the correcting unit 3*d* in turn. Thereby, the final lift amount setting unit 3*e* sets a control target value c1 with which the valve body of the EWG valve 1 is moved (lowered) at a highest speed that can be operated by the EWG motor 2 from fall initiation of the target lift amount to the soft landing initiation lift amount Lk1, and sets a control target value c2 with which the valve body of the EWG valve 1 is moved (lowered) at a predetermined seating speed from the soft landing initiation lift amount Lk1 to the soft landing completion lift amount Lt1 when the correction lift amount is consistent with the soft landing initiation lift amount Lk1.

Here, the soft landing initiation lift amount Lk1 and the soft landing completion lift amount Lt1 are defined by the long-term learning value B, the short-term learning value D, and the defined value (the constant) K. However, since the correction lift amount is given as the difference between the real lift amount and the short-term learning value D as described above, the soft landing initiation lift amount Lk1 and the soft landing completion lift amount Lt1 are amounts that are substantially defined only by the long-term learning value B and the defined value (constant) K. When the final lift amount setting unit 3*e* is configured to introduce the real lift amount rather than the correction lift amount, the soft landing initiation lift amount Lk becomes (Long-term learning value B+Defined value K), and the stop target lift amount Lt becomes (Long-term learning value B−Defined value K). These amounts are defined only by the long-term learning value B and the defined value (the constant) K.

On the other hand, the filter unit 3*a* sequentially samples sensor signals (analog signals) input from the lift sensor 2*a*, converts the results into detected voltage data (digital signals), and performs median filtering on the detected voltage data. Since a noise component derived from the sensor signal overlapping the detected voltage data is removed by the median filtering, the detected voltage data becomes a signal that more accurately indicates the lift amount. The detected voltage data (the voltage) from which noise is removed by the median filtering is converted into the lift amount in the control variable converting unit 3*b*.

Among the real lift amounts that are sequentially input from the control variable converting unit 3*b* whenever the engine is started using the IG ON signal input from the engine ECU as a trigger signal, the lift amount when the valve body of the EWG valve 1 is seated on the valve seat is learned as the long-term learning value B by the fully closed learning processing unit 3*c*. That is, the fully closed learning processing unit 3*c* determines the starting of the engine on the basis of the IG ON signal, and acquires and updates the fully closed lift amount when the valve body of the EWG valve 1 is first seated after the starting of the engine as the long-term learning value B. The fully closed learning processing unit 3*c* acquires and updates the fully closed lift amount whenever the valve body of the EWG valve 1 is seated on the valve seat as the short-term learning value D regardless of the starting of the engine which is indicated by the IG ON signal.

Here, the fully closed learning processing unit 3*c* stores the long-term learning value B when the engine is stopped in a non-volatile memory, and then outputs the stored long-term learning value B as the short-term learning value D and an initial value of the long-term learning value B when the engine is started. The fully closed learning processing unit 3*c* outputs the long-term learning value B as the short-term learning value D in regard to first seating when the engine is started.

A procedure for acquiring and updating these long-term and short-term learning values B and D is as shown in a timing chart of FIG. 4. That is, when the valve body of the EWG valve 1 is seated on the valve seat, the real lift amount E is gradually reduced according to the final target lift amount C, and becomes the fully closed lift amount when the valve body is seated on the valve seat. With regard to a change in this real lift amount E, when the final target lift amount C is less than or equal to the soft landing initiation lift amount Lk, a deviation between the final target lift amount C and the real lift amount E is more than or equal to a specified value, the real lift amount E is stabilized, and a driving DUTY reaches a soft landing DUTY lower limit value, the fully closed learning processing unit $3c$ determines that the valve body of the EWG valve 1 is seated on the valve seat, and permits fully closed learning initiation with a fully closed learning initiation determination flag set to be "TRUE."

When the fully closed learning initiation determination flag becomes "TRUE," the driving DUTY is limited to a fully closed learning DUTY lower limit value, and a stable determination timer (a timer 1) and a fully closed learning permission timer (a timer 2) begin to be operated. Afterwards, when the real lift amount E is stable and is within a fully closed learning range (between a predetermined learning upper limit value Lmax and a learning lower limit value Lmin) at a point in time at which the stable determination timer becomes "0," fully closed learning is completed normally, and a learning value updating process is performed.

The long-term learning value B of the long-term and short-term learning values B and D is updated only when the following conditions are satisfied. That is, the long-term learning value B is updated only when a measured value of a timer (an engine operation stop time timer) indicating a time from a stop of the starting of the engine to next starting of the engine exceeds a specified time (a period considered to have no influence from the thermal expansion), and the engine operation stop time timer is normal. With regard to a value stored in a backup memory (a non-volatile memory) in order to avoid wrong learning, when a value acquired by initial fully closed learning varies more than or equal to a specified fluctuation range, the long-term learning value B is corrected and updated to a value within the specified fluctuation range, and when the acquired value exceeds a specified limit value, the long-term learning value B is corrected and updated to an upper limit value or a lower limit value of the specified limit value.

Here, for example when there is a foreign material between the valve body and the valve seat of the EWG valve 1, the real lift amount E may be stabilized with a value greater than the learning upper limit value Lmax. In this case, since the real lift amount E is not within the fully closed learning range, it is determined that the learning is abnormal at a point in time at which the timer (the fully closed learning permission timer) 2 terminates the lapse of time of a fully closed learning permission period Tk. When a coupling mechanism in which the EWG motor 2 and the EWG valve 1 are mechanically connected is damaged, the real lift amount E may fall below the learning lower limit value Lmin. Even in this case, since the real lift amount E is not within the fully closed learning range, it is determined that the learning is abnormal at a point in time at which the timer (the fully closed learning permission timer) 2 terminates the lapse of time of the fully closed learning permission period Tk.

The long-term and short-term learning values B and D acquired by this learning process are provided to the final lift amount setting unit $3e$ and are used for the generation of the aforementioned final target lift amount C, whereas the short-term learning value D is supplied to the correcting unit $3d$. In the correcting unit $3d$, the short-term learning value D is subtracted from the real lift amount E, and the correction lift amount is generated.

Here, since the short-term learning value D is a value that is more frequently updated than the long-term learning value B, it indicates the fully closed lift amount more accurately than the long-term learning value B. In this way, since the real lift amount E is corrected using the short-term learning value D conforming to an actual situation rather than the long-term learning value B, the correction lift amount becomes a value indicating a more accurate position of the valve body in the EWG valve 1.

The position control unit $3f$ generates a position operation amount on the basis of a difference between the final target lift amount C and the correction lift amount, and outputs the result to the speed control unit $3g$. The speed control unit $3g$ generates a speed operation amount on the basis of a difference between the position operation amount and a differential value of the correction lift amount. The DUTY setting unit $3h$ generates a PWM signal for which a duty ratio is set depending on the speed operation amount, and outputs the result to the drive circuit $3i$. The drive circuit $3i$ generates a drive signal having a wave height value appropriate for the PWM signal to drive the EWG motor 2.

Here, a speed limiter is set for the speed control unit $3g$, and a DUTY limiter is set for the DUTY setting unit $3h$. Thus, the highest rotational speed of the EWG motor 2 is reliably limited within an allowable range. Especially, to reliably realize a predetermined seating speed in a period equivalent to a control target value $c2$ of the final target lift amount C, a dedicated DUTY limiter that is different from a period other than the control target value $c2$ is set. The DUTY limiter and the seating speed set to the control target value $c2$ are decided on the basis of to which extent an impact force when the valve body collides with the valve seat in the EWG valve 1 is suppressed or to which extent a service life of the EWG valve 1 is set.

According to the present embodiment, as illustrated in FIG. 3($b$), since a soft landing operation, by which the valve body of the EWG valve 1 is moved (lowered) at a soft landing speed with the soft landing initiation lift amount Lk1 set on the basis of the long-term learning value B as a starting point, is initiated, a time (a seating time) required for seating can be made shorter than in a case in which the soft landing operation is initiated with the soft landing initiation lift amount set on the basis of the short-term learning value D as a starting point.

For example, when the temperature of the EWG valve 1 increases so that a distance between the valve body and the valve seat is increased, that is, when the EWG valve 1 is subjected to thermal expansion, the short-term learning value D is updated whenever the valve body is seated, and is thus set to a great value due to an influence of the thermal expansion of the EWG valve 1. In contrast, the long-term learning value B is updated once just after the engine is started, and thus is not set to a great value even if the EWG valve 1 is subjected to thermal expansion. That is, when the thermal expansion of the EWG valve 1 occurs, a soft landing initiation lift amount Lk3 set on the basis of the short-term learning value D is equivalent to a greater value than a soft landing initiation lift amount Lk2 set on the basis of the long-term learning value B, that is, a position at which the valve body is further separated from the valve seat.

As a result, a seating time to when the soft landing operation is initiated on the basis of the long-term learning value B is made faster than a seating time tb when the soft landing operation is initiated on the basis of the short-term learning value D, so that the time required for the seating (the seating time) can be reduced.

According to the present embodiment, since the real lift amount E is corrected to generate the correction lift amount using the short-term learning value D in the correcting unit 3d, more accurate control of the EWG valve 1 can be realized compared to when the real lift amount E is corrected to generate the correction lift amount using the long-term learning value B.

The present invention is not limited to the above embodiment, and for example the following modifications are considered.

(1) In the above embodiment, the EWG valve 1 (the wastegate valve) is used as the control target valve, but the present invention is not limited thereto. The present invention can be applied to various valves other than the EWG valve 1 (the wastegate valve) in the engine, that is, various flow control valves or on-off valves.

(2) In the above embodiment, the control variable converting unit 3b is provided to thereby convert the detected voltage data (the voltage amount) into the lift amount, but the present invention is not limited thereto. For example, when the lift sensor 2a has the same function as the control variable converting unit 3b, or when the same functional component as the control variable converting unit 3b is provided aside from the EWG control unit 3 with respect to the lift sensor 2a, the degree-of-opening signal indicating the degree of opening of the EWG valve 1 may be input into the EWG control unit 3 from the lift sensor 2a or the functional component, and be filtered. In this case, a function equivalent to the filter unit 3a may be given to the lift sensor 2a or the functional component, the filter unit 3a of the EWG control unit 3 may be omitted.

REFERENCE SIGNS LIST

1 EWG valve (valve)
2 EWG motor (actuator)
2a Lift sensor
3 EWG control unit
3a Filter unit (control driving unit)
3b Control variable converting unit (control driving unit)
3c Fully closed learning processing unit
3d Correcting unit (control driving unit)
3e Final lift amount setting unit (target value setting unit)
3f Position control unit (control driving unit)
3g Speed control unit (control driving unit)
3h DUTY setting unit (control driving unit)
3i Drive circuit (control driving unit)

The invention claimed is:

1. A valve control device configured to control an actuator operating a valve on the basis of a degree-of-opening signal indicating a degree of opening of the valve and a startup signal indicating starting of an engine for which the valve is provided, the valve control device comprising:
a fully closed learning processing unit configured to learn a seated position at which a valve body of the valve is seated on a valve seat of the valve whenever the engine is started on the basis of the startup signal and the degree-of-opening signal;
a target value setting unit configured to set a soft-landing initiation position at which the valve body is initiated to soft-land on the basis of the seated position, and set a soft-landing completion position at which the valve body is stopped, the valve body being decelerated at the soft-landing initiation position to a predetermined seating speed; and
a control driving unit configured to generate a drive signal supplied to the actuator on the basis of the soft-landing completion position and the degree-of-opening signal, wherein:
the fully closed learning processing unit learns the seated position of the valve body whenever the engine is started to acquire a long-term learning value, and learns the seated position of the valve body whenever the valve body is seated to acquire a short-term learning value; and
the control driving unit corrects the degree of opening of the valve to generate the drive signal on the basis of the short-term learning value.

2. The valve control device according to claim 1, further comprising a filter unit configured to perform median filtering on the degree-of-opening signal and output the result to the control driving unit,
wherein the control driving unit includes a position control unit that generates a position operation amount of the valve body, and a speed control unit that generates a speed operation amount of the valve body.

3. The valve control device according to claim 2, wherein the speed control unit includes a speed limiter that regulates an upper limit of the seating speed at which the valve body is seated on the valve seat.

4. The valve control device according to claim 1, wherein the valve is a wastegate valve provided for a supercharger of the engine.

5. A valve system comprising:
a valve;
an actuator configured to operating the valve; and
the valve control device according to claim 1.

* * * * *